US011750758B2

(12) United States Patent
Mochizuki

(10) Patent No.: US 11,750,758 B2
(45) Date of Patent: Sep. 5, 2023

(54) INFORMATION PROCESSING APPARATUS HAVING CONTROL FOR LIMITING USE OF FUNCTION RELATED TO FAILURE

(71) Applicant: FUJIFILM BUSINESS INNOVATION CORP., Tokyo (JP)

(72) Inventor: Akiko Mochizuki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 663 days.

(21) Appl. No.: 16/515,080

(22) Filed: Jul. 18, 2019

(65) Prior Publication Data

US 2020/0267278 A1 Aug. 20, 2020

(30) Foreign Application Priority Data

Feb. 15, 2019 (JP) .................................. 2019-025662

(51) Int. Cl.
*H04N 1/32* (2006.01)
*H04N 1/00* (2006.01)

(52) U.S. Cl.
CPC ..... *H04N 1/32673* (2013.01); *H04N 1/00344* (2013.01); *H04N 1/00891* (2013.01); *H04N 1/00904* (2013.01)

(58) Field of Classification Search
CPC ........... H04N 1/32673; H04N 1/00344; H04N 1/00891; H04N 1/00904; H04N 1/32609–32694; H04L 41/06; G06F 11/0703–0748
See application file for complete search history.

(56) References Cited

U.S. PATENT DOCUMENTS

| 2004/0181712 A1* | 9/2004 | Taniguchi | ........... G06F 11/0733 |
| | | | 714/724 |
| 2014/0293316 A1* | 10/2014 | Takahashi | .......... H04N 1/00891 |
| | | | 358/1.14 |
| 2017/0038923 A1* | 2/2017 | Tsuzuki | ................ G06F 3/0482 |
| 2017/0111520 A1* | 4/2017 | Bowers | ................... G06F 21/32 |

FOREIGN PATENT DOCUMENTS

| JP | 2007-65417 A | 3/2007 |
| JP | 2009-151459 A | 7/2009 |
| JP | 2009-296202 A | 12/2009 |
| JP | 2016-119524 A | 6/2016 |
| WO | 2010-143223 A1 | 12/2010 |

OTHER PUBLICATIONS

Sep. 27, 2022 Office Action issued in Japanese Patent Application No. 2019-025662.

* cited by examiner

*Primary Examiner* — Nicholas Pachol

(74) *Attorney, Agent, or Firm* — Oliff PLC

(57) ABSTRACT

An information processing apparatus includes an acquisition unit, a power supply unit, and a controller. The acquisition unit acquires failure information for the information processing apparatus via a wireless communication line from a management apparatus holding failure information. The power supply unit supplies power to the acquisition unit when the main power supply is not on. The controller exerts control in such a manner that, when the acquisition unit acquires the failure information from the management apparatus in the state in which the main power supply is not on, only a subset of functions of the apparatus are activated by supplying power from the power supply unit, and a process for limiting use of a function related to the failure is performed.

5 Claims, 12 Drawing Sheets

FIG. 6

| FAILURE CLASSIFICATION | OCCURRENCE MODULE | OCCURRENCE CONDITION | ADDRESSING METHOD |
|---|---|---|---|
| IGNITION | IMAGE OUTPUT UNIT | CONTINUOUS OPERATION DURING MORE THAN ONE HOUR | POWER OF IMAGE OUTPUT UNIT IS TURNED OFF OR CONTINUOUS OPERATION TIME IS LIMITED |

FIG. 8

| FAILURE CLASSIFICATION | OCCURRENCE MODULE | OCCURRENCE CONDITION | CHANGE CODE |
|---|---|---|---|
| INFORMATION LEAKAGE | TELEPHONE LINE PORT | PORT ACTIVATION | 111333 (PROHIBITION OF USE OF PORT) |

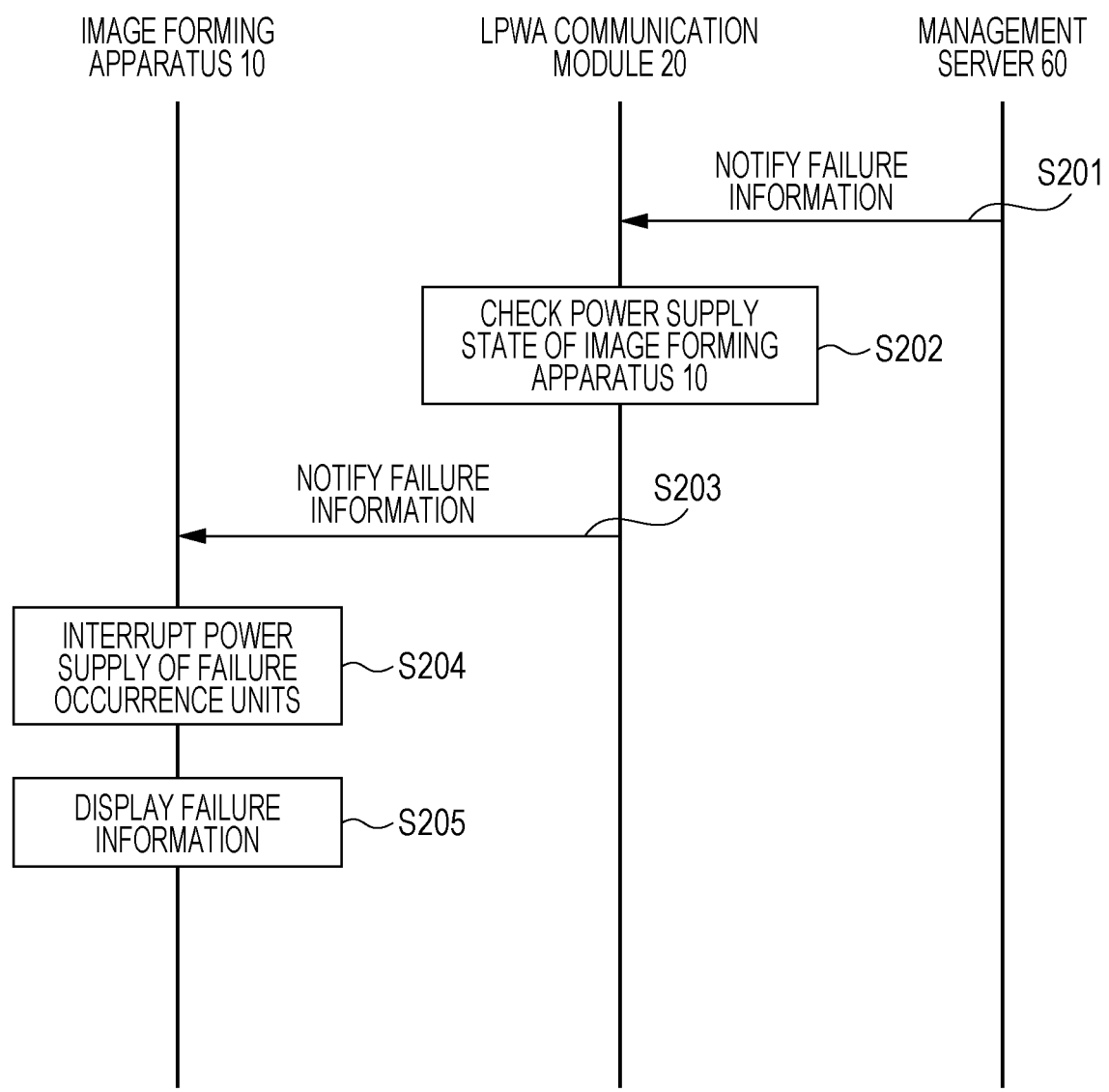

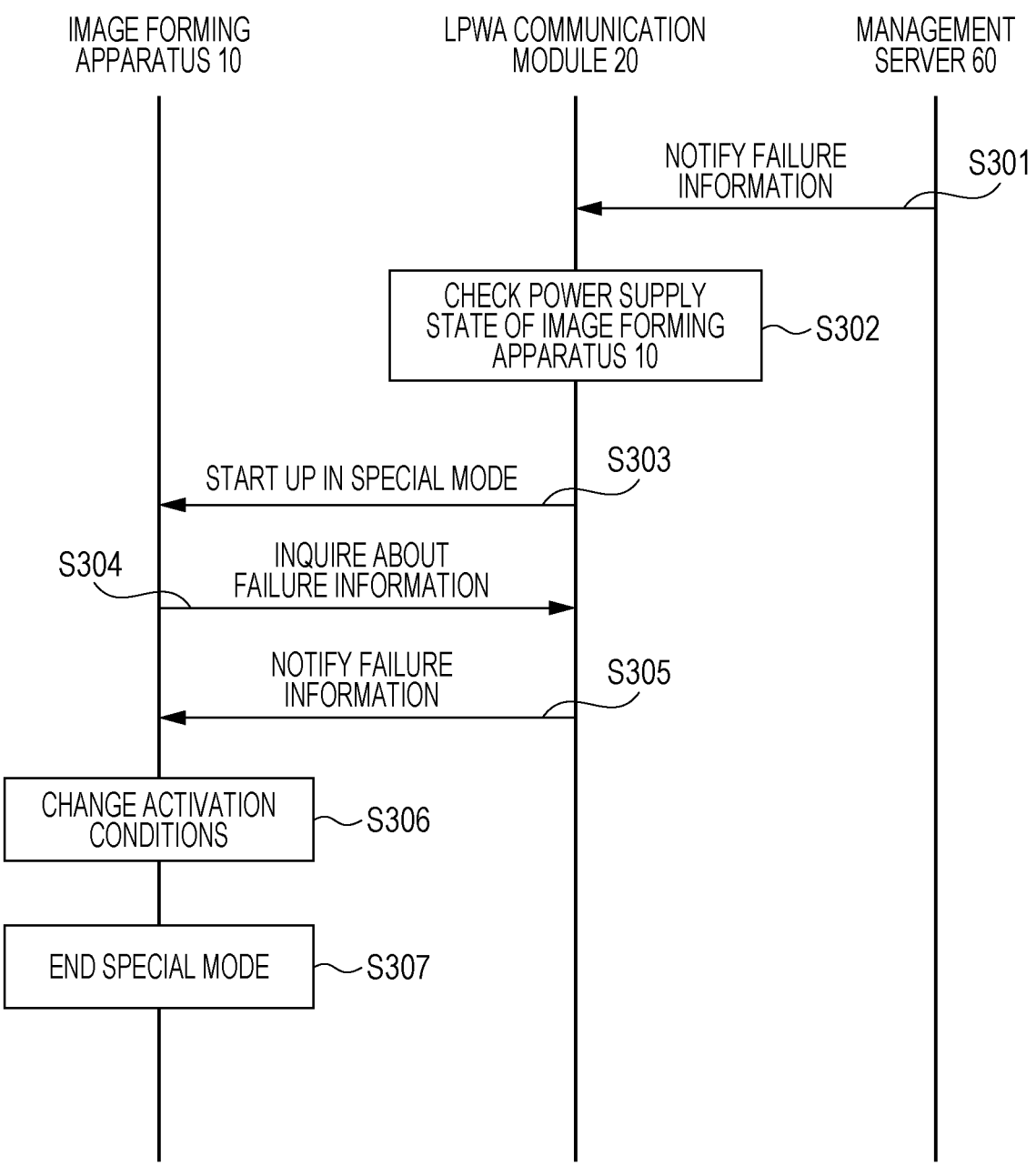

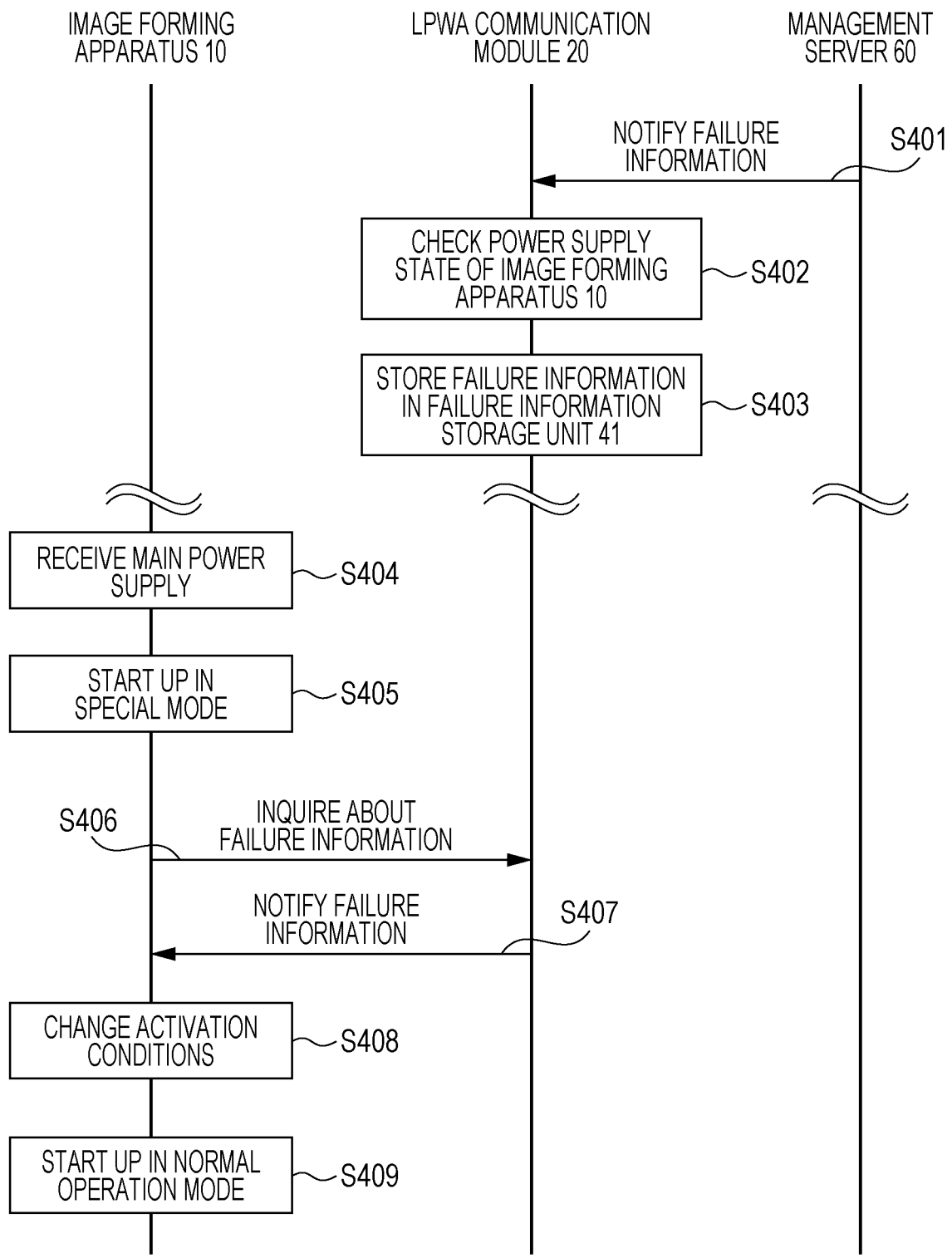

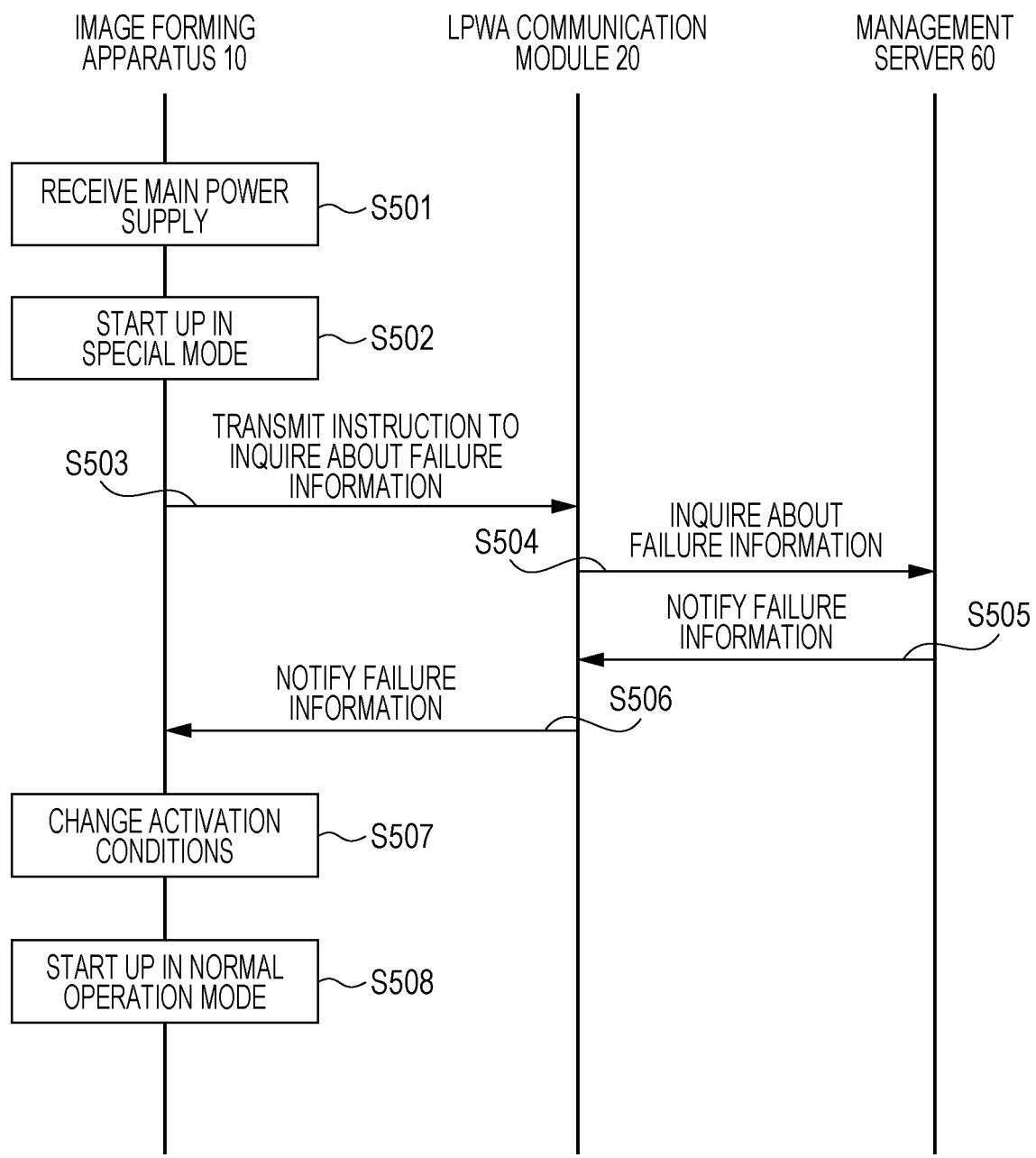

INFORMATION PROCESSING APPARATUS HAVING CONTROL FOR LIMITING USE OF FUNCTION RELATED TO FAILURE

CROSS-REFERENCE TO RELATED APPLICATIONS

This application is based on and claims priority under 35 USC 119 from Japanese Patent Application No. 2019-025662 filed Feb. 15, 2019.

BACKGROUND

(i) Technical Field

The present disclosure relates to an information processing apparatus.

(ii) Related Art

Japanese Unexamined Patent Application Publication No. 2007-065417 discloses an information display apparatus including a wide-area wireless communication module that performs communication over a cellular phone network and a narrow-area wireless communication module that communicates with other information display apparatuses through local communication. When an abnormality occurs in the state in which power supply to the wide-area wireless communication module has been interrupted, the information display apparatus is capable of notifying a management department of occurrence of the abnormality rapidly through local communication using the narrow-area wireless communication module.

Japanese Unexamined Patent Application Publication No. 2009-151459 discloses a system in which recall information is obtained from a server of a maker through power line communication and in which processes, such as power interruption and display of the recall information, are performed in accordance with the obtained recall information.

In the case where information about a failure is notified in the state in which power is not supplied to an apparatus, functions related to the failure may be used before limitation of use of the functions.

SUMMARY

Aspects of non-limiting embodiments of the present disclosure relate to an information processing apparatus. Even when failure information is notified in the case where the main power supply is not supplied, the information processing apparatus is capable of limiting use of functions related to the failure before the functions are used.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including an acquisition unit, a power supply unit, and a controller. The acquisition unit acquires failure information for the information processing apparatus via a wireless communication line from a management apparatus holding the failure information. The power supply unit supplies power to the acquisition unit when the main power supply is not on. The controller exerts control in such a manner that, when the acquisition unit acquires the failure information from the management apparatus in the state in which the main power supply is not on, only a subset of functions of the apparatus are activated by supplying power from the power supply unit, and a process for limiting use of a function related to a failure is performed.

BRIEF DESCRIPTION OF THE DRAWINGS

Exemplary embodiments of the present disclosure will be described in detail based on the following figures, wherein:

FIG. 6 is a diagram illustrating a failure information example transmitted from the management server;

FIG. 8 is a diagram illustrating another failure information example transmitted from the management server;

FIG. 9 is a sequence chart for describing operations performed between the image forming apparatus, the LPWA communication module, and the management server when the image forming apparatus in the power-on state receives failure information;

FIG. 10 is a sequence chart for describing operations between the image forming apparatus, the LPWA communication module, and the management server when the image forming apparatus in the power-off state receives failure information;

FIG. 11 is a sequence chart for describing operations between the image forming apparatus, the LPWA communication module, and the management server when the image forming apparatus in the power-off state receives failure information, in an information processing system according to a second exemplary embodiment of the present disclosure; and FIG. 12 is a sequence chart for describing operations performed between the image forming apparatus, the LPWA communication module, and the management server in an information processing system according to a third exemplary embodiment of the present disclosure.

DETAILED DESCRIPTION

Figure 1:
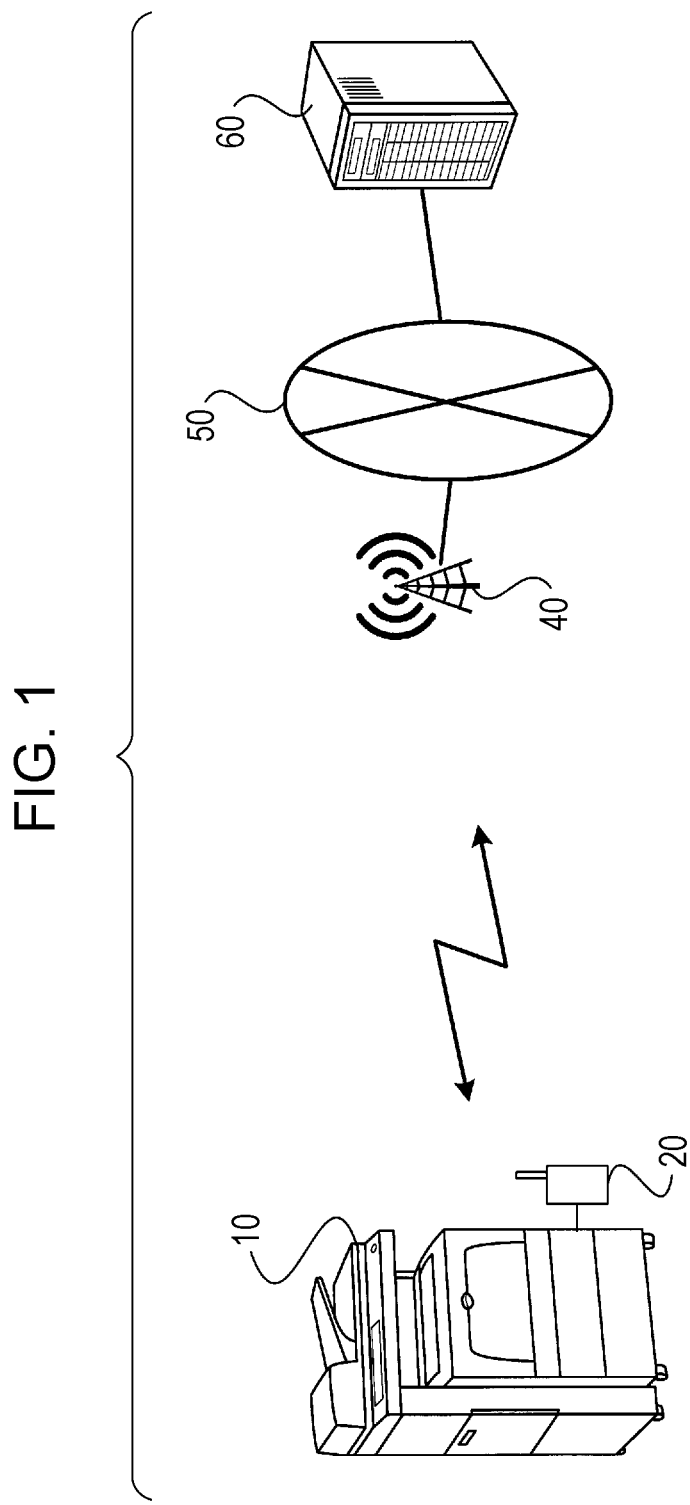
FIG. 1 is a diagram illustrating the system configuration of an information processing system according to a first exemplary embodiment of the present disclosure.

Exemplary embodiments of the present disclosure will be described in detail bellow by referring to the drawings.

First Exemplary Embodiment

FIG. 1 illustrates the system configuration of an information processing system according to a first exemplary embodiment of the present disclosure.

The information processing system according to the first exemplary embodiment has a configuration in which an image forming apparatus 10, a low power wide area (LPWA) communication module 20 connected to the image forming apparatus 10, and a management server 60, which manages failure information such as recall information, are connected to each other via a base station 40 and an LPWA communication network 50.

Herein, the failure information means information about a big quality problem notified from the manufacturer or the like of an apparatus when it is found that use of the apparatus causes the quality problem. The failure information includes information, such as recall information, about a quality problem causing a physical event, such as ignition or smoking. In addition, the failure information includes, for example, information about a quality problem such as vulnerability in security.

If the image forming apparatus 10 is connected to the management server 60, for example, via an Internet line, the image forming apparatus 1, is capable of obtaining failure information from the management server 60, determining whether or not the failure information is related to the image forming apparatus 10, and taking some measures if the failure information is related to the image forming apparatus 10.

However, for example, in the case where the image forming apparatus 10, which is not supplied with power, has not been used for a long time, or where the image forming apparatus 10 is stored in a warehouse without being connected to a power supply, even if failure information about a big quality problem such as new recall information is transmitted from the management server 60, the image forming apparatus 10 fails to receive the failure information.

When the management server 60 according the first exemplary embodiment is notified of failure information from a manufacturer such as a maker, the management server 60 transmits the failure information over the LPWA communication network 50. The image forming apparatus 10, which is connected to the LPWA communication module 20, receives the failure information from the management server 60 over the LPWA communication network 50.

The LPWA, which is also called a low power wide area network (LPWAN), is a wireless communication line which is not capable of performing high-speed communication, but which is capable of receiving/transmitting data in a wide area with low consumption power.

The LPWA is a wireless communication line which is capable of establishing a connection with the management server 60 without network setting. The LPWA is a wireless communication line for a wide-area wireless communication network in which data is received/transmitted at a communication speed lower than that of the Internet which is an external network.

Recently, a commercial service for the LPWA wireless communication line has been provided, and may be used with communication charges lower than those for the cellular phone network line contract.

The LPWA communication module 20 according to the first exemplary embodiment includes a battery. Thus, the LPWA communication module 20 may receive failure information, which is transmitted from the management server 60, even in the state in which the image forming apparatus 10 is not supplied with the main power supply. The configuration of the LPWA communication module 20 will be described below.

Figure 2:
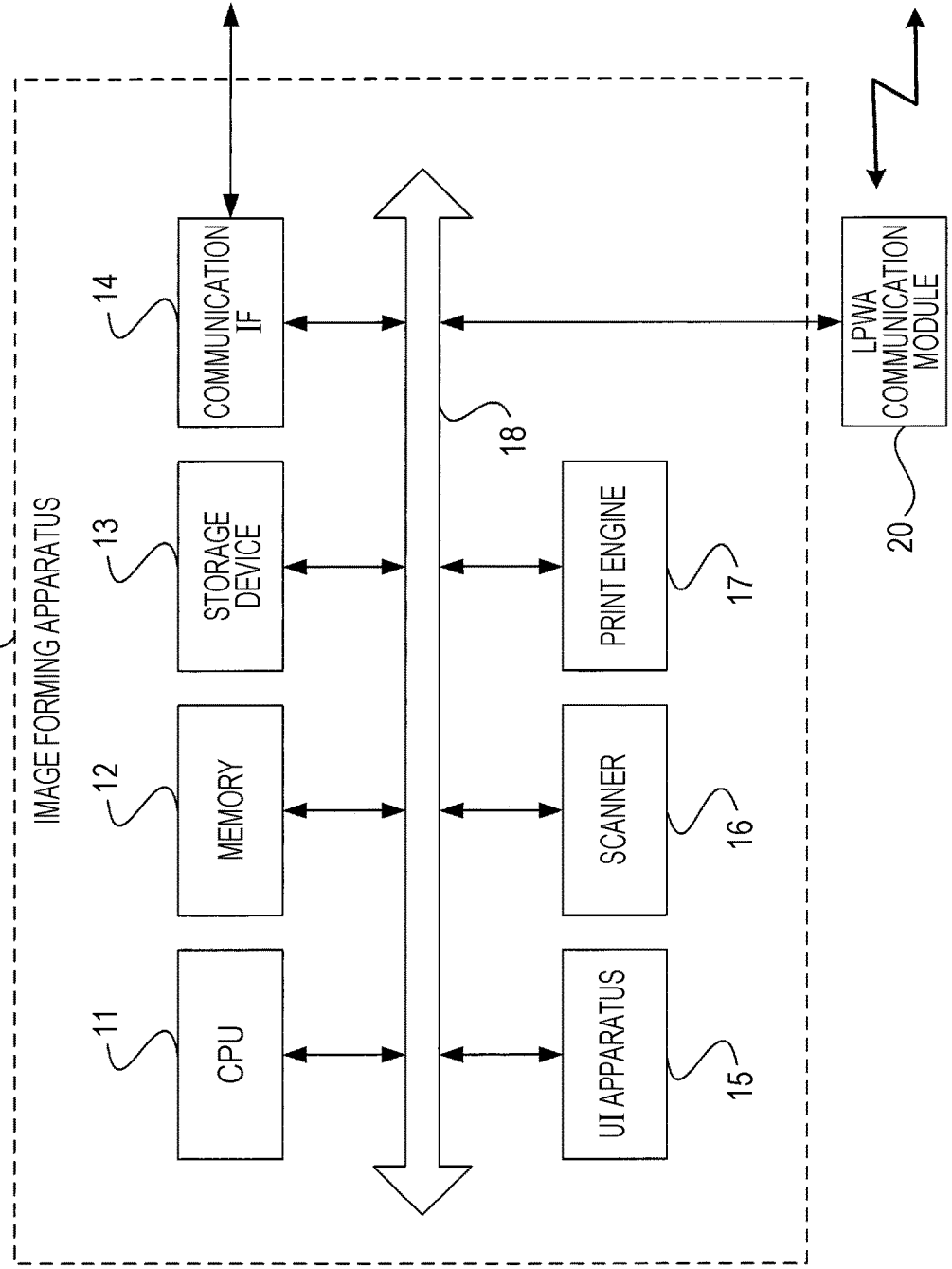
FIG. 2 is a block diagram illustrating the hardware configuration of an image forming apparatus according to the first exemplary embodiment of the present disclosure.

FIG. 2 is a block diagram illustrating the hardware configuration of the image forming apparatus 10 illustrated in FIG. 1.

As illustrated in FIG. 2, the image forming apparatus 10 includes a central processing unit (CPU) 11, a memory 12, a storage device 13 such as a hard disk drive (HDD), a communication interface (IF) 14 for receiving/transmitting data from/to another image forming apparatus 10 or the like over the network such as the Internet, a user interface (UI) apparatus 15 including a touch panel or a liquid-crystal display and a keyboard, a scanner 16, and a print engine 17. These components are connected to one another via a control bus 18. The LPWA communication module 20 is also connected to the above-described components via the control bus 18.

The CPU 11 performs given processes on the basis of control programs, which are stored in the memory 12 or the storage device 13, so as to control operations of the image forming apparatus 10. In the first exemplary embodiment, the CPU 11 reads, for execution, the control programs stored in the memory 12 or the storage device 13. Alternatively, the programs may be stored in a storage medium such as a compact disc-read-only memory (CD-ROM) so as to be provided to the CPU 11.

Figure 3:
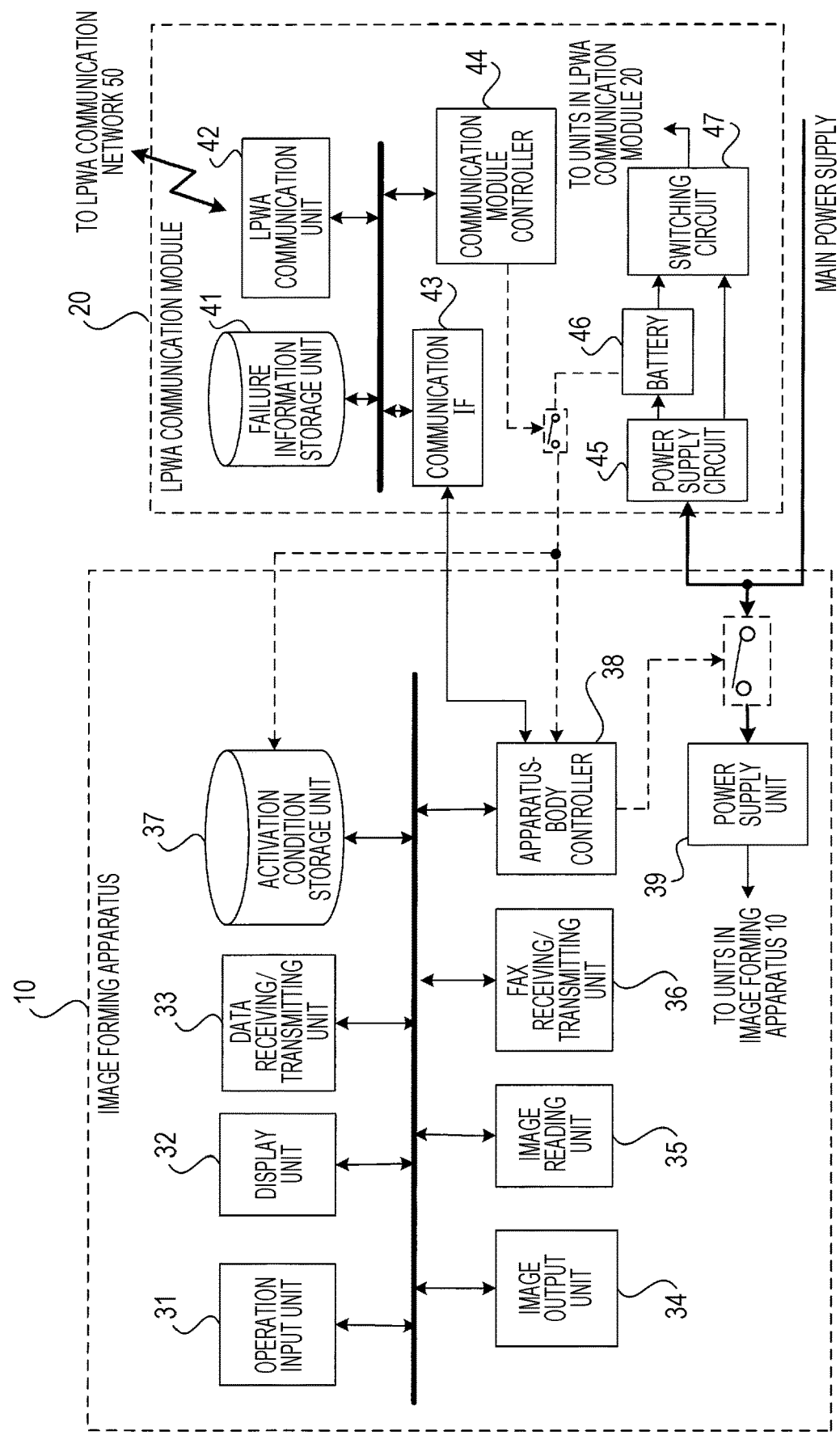
FIG. 3 is a block diagram illustrating the functional configuration of the image forming apparatus according to the first exemplary embodiment of the present disclosure.

FIG. 3 is a block diagram illustrating the functional configuration of the image forming apparatus 10 implemented through execution of the control programs.

As illustrated in FIG. 3, the image forming apparatus 10 according to the first exemplary embodiment includes an operation input unit 31, a display unit 32, a data receiving/transmitting unit 33, an image output unit 34, an image reading unit 35, a FAX receiving/transmitting unit 36, an activation condition storage unit 37, an apparatus-body controller 38, and a power supply unit 39.

The operation input unit 31 receives various operations performed by users. The display unit 32 displays various type of information to users. The data receiving/transmitting unit 33 receives/transmits data from/to external apparatuses via a network line.

The image output unit 34 outputs an image on a recording medium such as a print sheet. The image reading unit 35 reads an image from a document which has been set. The FAX receiving/transmitting unit 36 receives/transmits FAX data from/to external FAX reception/transmission apparatuses via a telephone line.

The apparatus-body controller 38 controls operations of the units included in the image forming apparatus 10, such as the image output unit 34, the image reading unit 35, and the FAX receiving/transmitting unit 36.

The power supply unit 39 receives, as the main power supply, commercial power supply from the outside, and supplies power to the units included in the image forming apparatus 10, such as the image output unit 34, the image reading unit 35, and the FAX receiving/transmitting unit 36. A switch is provided between the power supply unit 39 and the main power supply. The apparatus-body controller 38 may exert control so as to switch between on and off in supply of the main power supply to the power supply unit 39.

The activation condition storage unit 37 stores activation conditions indicating settings describing how functions are to be individually activated in start-up when the main power supply is turned on.

Figure 4:
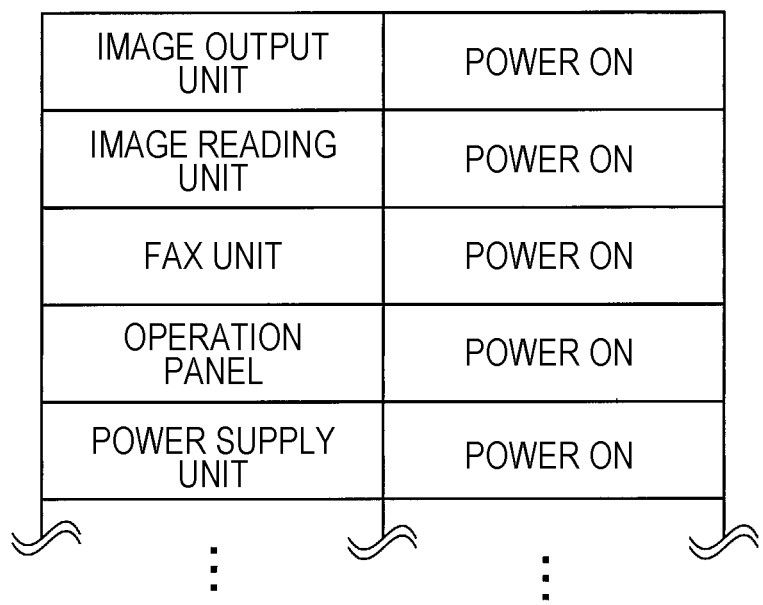
FIG. 4 is a diagram illustrating an activation condition example stored in an activation condition storage unit.

FIG. 4 illustrates an activation condition example stored in the activation condition storage unit 37. In the activation condition example illustrated in FIG. 4, settings about in which state each of the following units is to be activated in start-up are set: an image output unit corresponding to the image output unit 34; an image reading unit corresponding to the image reading unit 35; a FAX unit corresponding to the FAX receiving/transmitting unit 36; an operation panel; and a power supply unit. The expression "power on" means that the corresponding unit is to be activated in the power-on state in start-up.

The apparatus-body controller 38 refers to the activation conditions and controls the activation states of the units when the image forming apparatus 10 is supplied with the main power supply for start-up.

As illustrated in FIG. 3, the LPWA communication module 20 includes a failure information storage unit 41, an LPWA communication unit 42, a communication interface (IF) 43, a communication module controller 44, a power supply circuit 45, a battery 46, and a switching circuit 47.

The communication module controller 44 is connected to the LPWA communication network 50 via the LPWA communication unit 42. Thus, the communication module controller 44 obtains, over the LPWA, failure information for the image forming apparatus 10 from the management server 60 holding failure information. The communication module controller 44 stores the obtained failure information in the failure information storage unit 41.

The power supply circuit 45 is supplied with the main power supply described above, and produces a voltage for charging the battery 46 and a voltage supplied to the units in the LPWA communication module 20.

The battery 46 is a secondary battery charged with the voltage produced by the power supply circuit 45, and is charged during supply of the main power supply.

The switching circuit 47 performs switching as follows. When the main power supply is turned on, the voltage, which is produced by the power supply circuit 45, is supplied to the units in the LPWA communication module 20; when supply of the main power supply is stopped, the voltage of the battery 46 is supplied to the units in the LPWA communication module 20.

That is, in the normal state in which the main power supply is on, the LPWA communication module 20 operates with the main power supply from the image forming apparatus 10. In the state in which the main power supply is not on, the LPWA communication module 20 operates with power supplied from the battery 46 included in the LPWA communication module 20.

The communication module controller 44 is capable of supplying power from the battery 46 to the apparatus-body controller 38 and the activation condition storage unit 37 in the image forming apparatus 10 so that the apparatus-body controller 38 and the activation condition storage unit 37 operate.

That is, when the main power supply is not on, the battery 46 serves as a power supply unit that supplies power to the communication module controller 44, the LPWA communication unit 42, the failure information storage unit 41, the communication IF 43, and the like.

The communication module controller 44 exerts control as follows. In the state in which the main power supply is not on, when failure information is obtained from the management server 60, the communication module controller 44 supplies power from the battery 46. Thus, the communication module controller 44 activates only some of the functions in the image forming apparatus and performs processes of limiting use of functions related to the failure.

Specifically, the communication module controller 44 exerts control as follows. In the state in which the main power supply is not on, when failure information is obtained from the management server 60, power is supplied to the apparatus-body controller 38 and the activation condition storage unit 37 from the battery 46. Thus, the image forming apparatus 10 is activated in the special mode, and only functions for changing activation conditions, which are stored in the activation condition storage unit 37, are operated so that processes of limiting use of the functions related to the failure are performed.

The LPWA communication module 20 includes the communication IF 43 for receiving/transmitting data from/to the apparatus-body controller 38. Thus, data is capable of being received/transmitted from/to the apparatus-body controller 38 which has been activated in the special mode.

In the special mode, units, such as the image output unit 34, the image reading unit 35, the FAX receiving/transmitting unit 36, and the power supply unit 39, are not turned on, but power from the LPWA communication module 20 is supplied so that the activation condition storage unit 37, in which the activation conditions are stored, and only functions of the interface units for reading/writing data in the activation condition storage unit 37 are made available.

When the image forming apparatus 10 is instructed to start up in the special mode, the image forcing apparatus 10 starts up in the special mode, and inquires about failure information to the LPWA communication module 20.

When failure information is obtained from the LPWA communication module 20, the image forming apparatus 10 changes activation conditions, which are stored in the activation condition storage unit 37, so that units having functions related to the failure will not be supplied with power even when the main power supply is turned on. Thus, use of the functions related to the failure is limited.

Specifically, when a function related to the failure has multiple operation modes (or operation states), the image forming apparatus 10 changes the operation mode of the function, which is related to the failure, to an operation mode in which no problem will occur. Thus, use of the function related the failure is limited.

When a function related to the failure has multiple operation modes of different security levels, the image forming apparatus 10 changes the operation state of the function, which is related to the failure, to an operation mode of a high security level in which no problem will occur.

Operations of the image forming apparatus 10 and the LPWA communication module 20 according to the first exemplary embodiment will be described in detail by referring to drawings.

Figure 5:
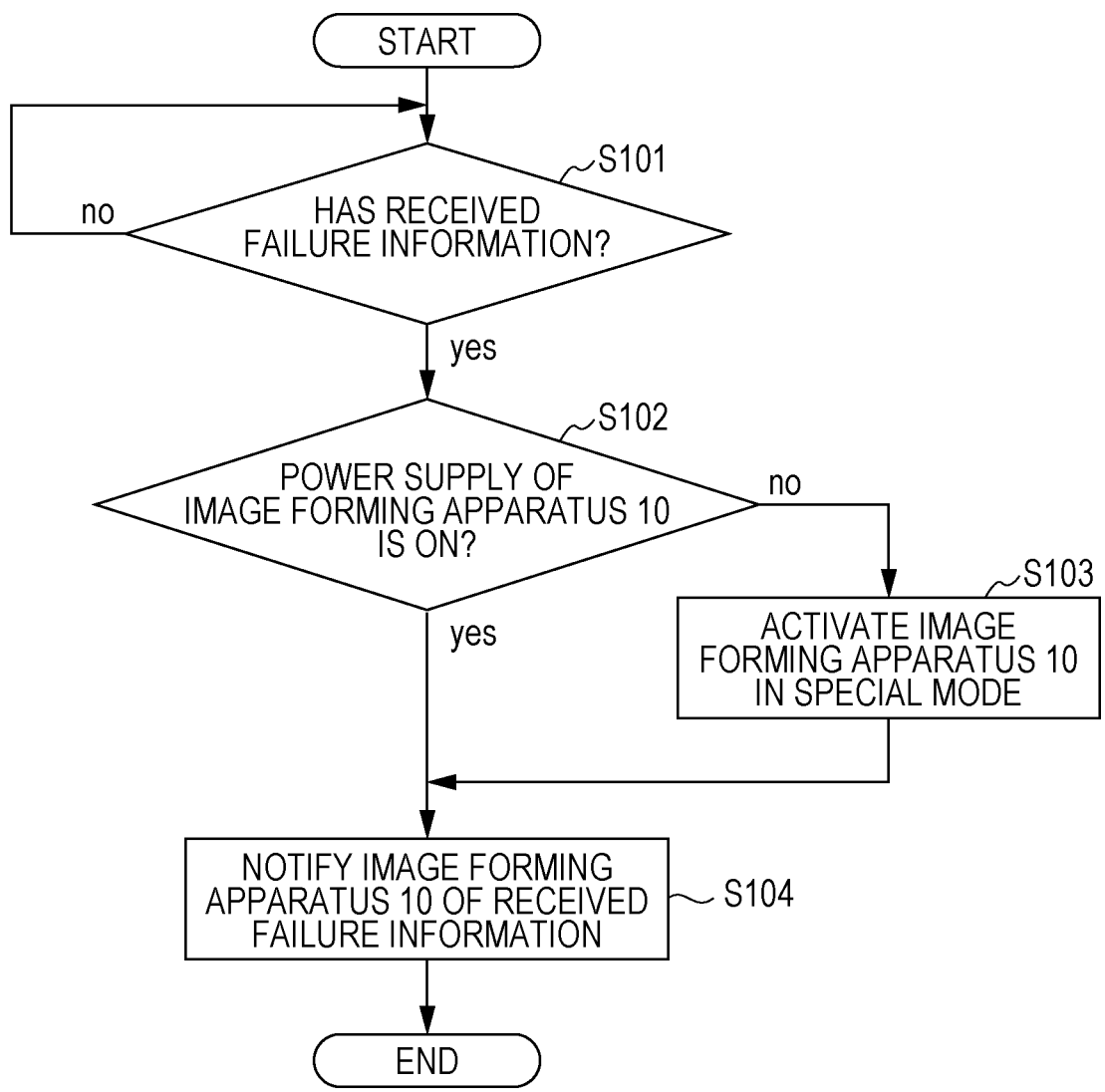
FIG. 5 is a flowchart for describing operations performed when a low power wide area (LPWA) communication module receives failure information from a management server.

First, operations performed when the LPWA communication module 20 receives failure information from the management server 60 will be described by referring to the flowchart in FIG. 5.

When the LPWA communication unit 42 receives failure information from the management server 60 in step S101, the LPWA communication module 20 determines whether or not the power supply of the image forming apparatus 10 is in the on state in step S102.

If the LPWA communication module 20 determines that the power supply of the image forming apparatus 10 is in the on state in step S102, the communication module controller 44 of the LPWA communication module 20 notifies the image forming apparatus 10 of the received failure information in step S104.

If the LPWA communication module 20 determines that the power supply of the image forming apparatus 10 is not in the on state in step S102, the communication module controller 44 of the LPWA communication module 20 activates the image forming apparatus 10 in the special mode in step S103. The communication module controller 44 of the LPWA communication module 20 notifies the image forming apparatus 10 of the received failure information in step S104.

FIG. 6 illustrates a failure information example transmitted from the management server 60. The failure information example illustrated in FIG. 6 includes information of "ignition" as failure classification, "image output unit" as an occurrence module, "continuous operation during more than one hour" as an occurrence condition, and "Power of the image output unit is turned off or the continuous operation time is limited" as an addressing method.

Assume the case in which, when the LPWA communication module 20 receives the failure information illustrated in FIG. 6, the image forming apparatus 10 is in the power-on state. In this case, when the image forming apparatus 10 obtains the failure information from the LPWA communication module 20, the image forming apparatus 10 determines that the power supply of the image output unit is to enter the off state. Then, the image forming apparatus 10 shuts down the power supply of the image output unit immediately. Thus, the image forming apparatus 10 enters the state in which copying and printing are not capable of being performed, but, for example, FAX transmission and reception-accumulation are capable of being performed in scanning. Alternatively, since the occurrence condition describes "operation during more than one hour", the image forming apparatus 10 may measure the operating time of the image output unit, and may shut down the power supply so that the operating time does not exceed one hour.

In either case, the image forming apparatus 10 rewrites and thus changes activation conditions, which are stored in the activation condition storage unit 37, so that the addressing process is performed also in the next start-up.

Figure 7:
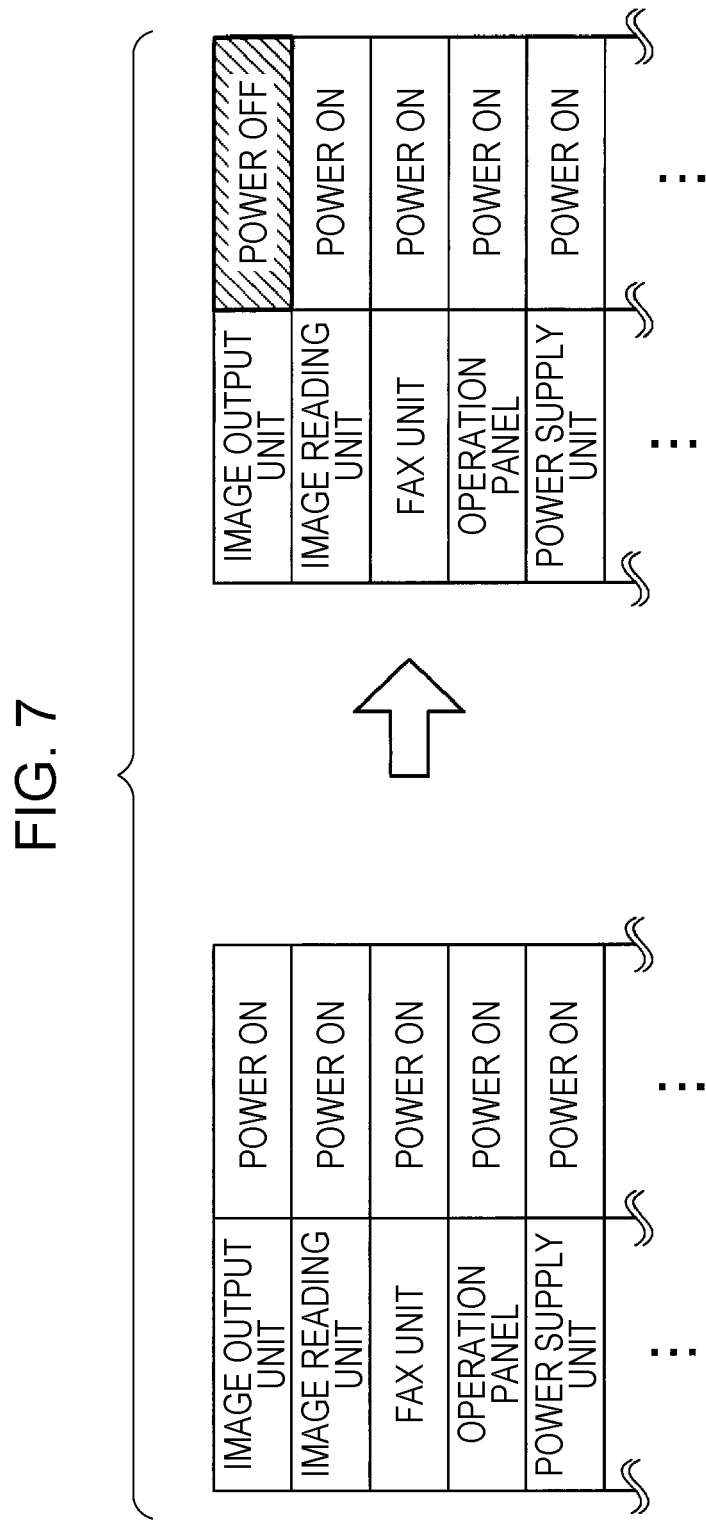
FIG. 7 is a diagram for describing a change example in activation conditions.

FIG. 7 illustrates a change example of the activation conditions. The change example of the activation conditions in FIG. 7 is an example of the case in which the failure information as illustrated in FIG. 6 is received. FIG. 7 shows that the activation condition of the image output unit is changed from "power on" to "power off". Such a change of the activation condition causes the apparatus-body controller 38 to exert control so that power supply will not be turned on for the image output unit in the next start-up. Thus, the image output unit enters the power-off state.

FIG. 8 illustrates another failure information example transmitted from the management server 60. The failure information example in FIG. 8 includes information of "information leakage" as failure classification, "telephone line port" as an occurrence module, "port activation" as an occurrence condition, and "111333 (prohibition of use of a port)" as a change code.

The failure information example indicates an example of the case in which a big quality problem in that information may leak from a telephone line port has occurred. The change code is code information indicating an addressing method, and means prohibition of use of a port. If the address, the identifier, or the like of a memory area, in which the corresponding activation condition is recorded, of the activation condition storage unit 37 is specified, the identifier or the like may be transmitted as failure information. In this case, the image forming apparatus 10 rewrites the value of the memory corresponding to the received identifier from "activation" to "non-activation", and performs a setting update process such as rebooting. Thus, the function, in which the problem occurs, may be changed to the off state immediately. In addition, a start-up process using the settings which will cause no problem may be performed in the next and subsequent start-ups.

FIG. 9 is a sequence chart illustrating operations performed between the image forming apparatus 10, the LPWA communication module 20, and the management server 60 when the image forming apparatus 10 in the power-on state receives failure information, as described above.

In step S201, the LPWA communication module 20 receives failure information from the management server 60. In step S202, the LPWA communication module 20 checks the power supply state of the image forming apparatus 10. In this example, since the image forming apparatus 10 is in the power-on state, the LPWA communication module 20 notifies the image forming apparatus 10 of the received failure information in step S203.

In step S204, the image forming apparatus 10, which has received failure information, changes activation conditions on the basis of the received failure information, and interrupts the power supply of units in which the failure may occur. In step S205, the image forming apparatus 10 displays the failure information and ends the process.

FIG. 10 is a sequence chart illustrating operations performed between the image forming apparatus 10, the LPWA communication module 20, and the management server 60 when the image forming apparatus 10 in the power-off state receives failure information.

In step S301, the LPWA communication module 20 receives failure information from the management server 60. In step S302, the LPWA communication module 20 checks the power supply state of the image forming apparatus 10. In this example, since the image forming apparatus 10 is in the power-off state, the LPWA communication module 20 instructs the image forming apparatus 10 to start up in the special mode in step S303.

Then, the image forming apparatus 10 starts up in the special mode. In step S304, the image forming apparatus 10 inquires about failure information to the LPWA communication module 20. In step S305, the LPWA communication module 20 notifies the image forming apparatus 10 of the received failure information.

In step S306, the image forming apparatus 10, which has received the failure information, changes activation conditions on the basis of the received failure information. In step S307, the image forming apparatus 10 ends the special mode.

Second Exemplary Embodiment

An information processing system according to a second exemplary embodiment of the present disclosure will be described. The configuration of the information processing system according to the second exemplary embodiment is substantially the same as that according to the first exemplary embodiment described above. The identical reference characters will be used in the description.

In the second exemplary embodiment, in the case where the power supply of the image forming apparatus 10 is in the off state when the LPWA communication module 20 receives failure information, the LPWA communication module 20 stores the received failure information in the failure information storage unit 41, instead of activating the image forming apparatus 10 in the special mode.

That is, when the communication module controller 44 obtains failure information from the management server 60 in the state in which the main power supply is not on, the communication module controller 44 stores the obtained failure information in the failure information storage unit 41.

The communication module controller 44 exerts control as follows. When the main power supply is turned on and the image forming apparatus 10 starts up, the image forming apparatus 10 is notified of the failure information stored in the failure information storage unit 41, and processes of limiting use of functions related to the failure are performed.

Also in the second exemplary embodiment, the operations, which are performed in the case where the power supply of the image forming apparatus 10 is in the on state when the LPWA communication module 20 receives failure information, are substantially the same as those according to the first exemplary embodiment described above. Thus, the description about this will not be made.

FIG. 11 is a sequence chart illustrating operations between the image forming apparatus 10, the LPWA communication module 20, and the management server 60 when the image forming apparatus 10 in the power-off state receives failure information, in the information processing system according to the second exemplary embodiment.

In step S401, the LPWA communication module 20 receives failure information from the management server 60. In step S402, the LPWA communication module 20 checks the power supply state of the image forming apparatus 10. In this example, since the image forming apparatus 10 is in the power-off state, the LPWA communication module 20 stores the received failure information in the failure information storage unit 41 in step S403.

After that, in step S404, the image forming apparatus 10 is supplied with the main power supply. In step S405, the image forming apparatus 10 starts up in the special mode. In step S406, the image forming apparatus 10 inquires about failure information to the LPWA communication module 20. In step S407, the LPWA communication module 20 notifies the image forming apparatus 10 of the failure information stored in the failure information storage unit 41.

In step S408, the image forming apparatus 10 changes activation conditions stored in the activation condition storage unit 37. In step S409, the image forming apparatus 10 starts up in the normal operation mode.

In the second exemplary embodiment, before activation in the normal operation mode, activation conditions are changed. Therefore, functional units in which a problem may occur are not supplied with power supply in the image forming apparatus 10.

Third Exemplary Embodiment

An information processing system according to a third exemplary embodiment of the present disclosure will be described.

The configuration of the information processing system according to the third exemplary embodiment is substantially the same as that according to the first exemplary embodiment described above. The identical reference characters will be used in the description. However, in the third exemplary embodiment, failure information is not obtained from the management server 60 in the state in which the main power supply is not on. Therefore, the LPWA communication module 20 may operate without the battery 46.

In the third exemplary embodiment, when the main power supply is turned on, the apparatus-body controller 38 of the image forming apparatus 10 causes the image forming apparatus 10 to start up in the special mode, not in the normal operation mode. In the special mode, the apparatus-body controller 38 instructs the LPWA communication module 20 to obtain failure information.

When the communication module controller 44 is supplied with the main power supply, in response to the instruction from the apparatus-body controller 38, the communication module controller 44 checks if the management server 60 has failure information for the image forming apparatus 10. If the communication module controller 44 obtains failure information for the image forming apparatus 10 from the management server 60, the communication module controller 44 exerts control so that processes of limiting use of functions related to the failure are performed. Specifically, the communication module controller 44 notifies the apparatus-body controller 38 of the failure information obtained from the management server 60. Then, the apparatus-body controller 38 changes activation conditions stored in the activation condition storage unit 37 on the basis of the received failure information so that power supply is not turned on for the functions related to the failure. After that, the apparatus-body controller 38 activates the image forming apparatus 10 in the normal operation mode.

FIG. 12 is a sequence chart illustrating operations performed between the image forming apparatus 10, the LPWA communication module 20, and the management server 60 in the information processing system according to the third exemplary embodiment.

When the image forming apparatus 10 is supplied with the main power supply in step S501, the image forming apparatus 10 starts up in the special mode in step S502.

In step S503, the image forming apparatus 10 instructs the LPWA communication module 20 to inquire about failure information.

As a result, in step S504, the LPWA communication module 20, which has received the instruction from the image forming apparatus 10, inquires about whether or not failure information for the image forming apparatus 10 is present, to the management server 60.

In step S505, the LPWA communication module 20 is notified of failure information from the management server 60. In step S506, the LPWA communication module 20 notifies the image forming apparatus 10 of the received failure information.

In step S507, the image forming apparatus 10 changes activation conditions, which are stored in the activation condition storage unit 37, on the basis of the received failure information. In step S508, the image forming apparatus 10 starts up in the normal operation mode.

MODIFIED EXAMPLE

According to the above-described exemplary embodiments, the case in which the present disclosure is applied to an apparatus including the image forming apparatus 10 and the LPWA communication module 20 is described. The present disclosure is not limited to this. Similarly, the present disclosure may be applied also to an information processing apparatus including the apparatus body and an LPWA communication module.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a processor programmed to function as an acquisition unit that acquires failure information for the information processing apparatus via a wireless communication line from a management apparatus holding the failure information;
   a power supply unit that supplies power to the acquisition unit when a main power supply receiving commercial power from an outside of the information processing apparatus is not on, the power supply unit being a battery; and
   a controller configured to, when the acquisition unit acquires the failure information in a state when the main power supply is not on:
      receive, from an activation storage unit within the apparatus, activation conditions instructing which functions are to be restricted based upon the acquired failure information; and
      prohibit power to units capable of performing the functions according to the activation conditions, but allow use of units other than the units capable of performing the functions according to the activation conditions.

2. The information processing apparatus according to claim 1,
   wherein, in the apparatus, when the function related to the failure has a plurality of operation states, an operation state of the function related to the failure is changed to such an operation state that no problem will occur, and use of the function related to the failure is thus limited.

3. The information processing apparatus according to claim 2,
   wherein, in the apparatus, when the function related to the failure has a plurality of operation states of different security levels, an operation state of the function related to the failure is changed to an operation state of a high security level, and the change to the operation state in which no problem will occur is thus performed.

4. An information processing apparatus comprising:
   a processor programmed to function as an acquisition unit that acquires failure information for the information processing apparatus via a wireless communication line from a management apparatus holding the failure information;
   a storage unit having a memory and that stores the failure information acquired from the management apparatus by the acquisition unit;
   a power supply unit that supplies power to the acquisition unit when a main power supply receiving commercial power from an outside of the information processing apparatus is not on, the power supply being a battery; and
   a controller configured to, when the acquisition unit acquires the failure information in a state when the main power supply is not on:
      receive, from an activation storage unit within the apparatus, activation conditions instructing which functions are to be restricted based upon the acquired failure information; and
      prohibit power to units capable of performing the functions according to the activation conditions, but allow use of units other than the units capable of performing the functions according to the activation conditions.

5. An information processing apparatus comprising:
   a processor programmed to function as an acquisition unit that acquires failure information for the information processing apparatus via a wireless communication line from a management apparatus holding the failure information; and
   a controller configured to, when the acquisition unit acquires the failure information in the state when the main power supply is not on:
      receive, from an activation storage unit within the apparatus, activation conditions instructing which functions are to be restricted based upon the acquired failure information; and
      prohibit power to units capable of performing the functions according to the activation conditions, but allow use of units other than the units capable of performing the functions according to the activation conditions.

* * * * *